J. G. MOOMY.
METHOD OF FORMING PATCHES FOR RUBBER ARTICLES.
APPLICATION FILED SEPT. 4, 1913.
1,111,803.  Patented Sept. 29, 1914.
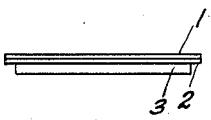
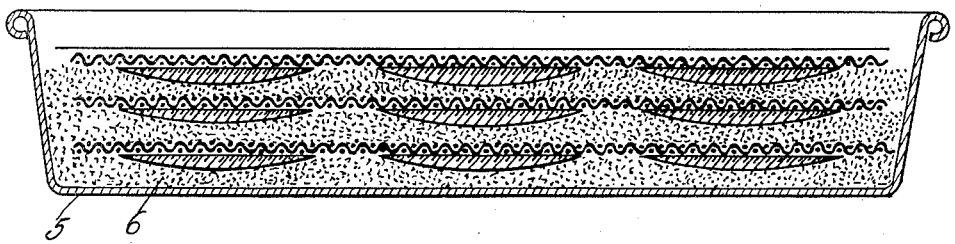

UNITED STATES PATENT OFFICE.

JOSEPH G. MOOMY, OF ERIE, PENNSYLVANIA.

METHOD OF FORMING PATCHES FOR RUBBER ARTICLES.

1,111,803. Specification of Letters Patent. Patented Sept. 29, 1914.

Application filed September 4, 1913. Serial No. 788,115.

*To all whom it may concern:*

Be it known that I, JOSEPH G. MOOMY, a citizen of the United States, residing at Erie, in the county of Erie and State of Pennsylvania, have invented new and useful Improvements in the Method of Forming Patches for Rubber Articles, of which the following is a specification.

This invention relates to the method of forming patches for rubber articles and consists in certain improvements in construction therein as will be hereinafter described and pointed out in the claims.

Patches for rubber articles have been formed having one face of raw rubber and the other of vulcanized rubber, the face of raw rubber being the adhesive face of the patch. In my patent dated July 29, 1913, I have shown and described such a patch. It is desirable in order to assure the freshness of the surface of raw rubber so that it will readily adhere to rubber surfaces, to exclude the air as much as possible from this face of raw rubber.

The method forming the subject matter of this invention has for its object a simple method to be used in connection with the manufacture of such patches for excluding very largely the air from the surface of the finished patch.

The method will be better understood from the accompanying drawing wherein—

Figure 1 is a side elevation of the assembled layers which make up the patch. Fig. 2 is a side elevation of the shaped patch. Fig. 3 is a sectional view of the patches on a fabric ready for vulcanization. Fig. 4 is a sectional view of the vulcanizer pan the patches arranged on fabric in position to be vulcanized. Fig. 5 shows the finished patches.

The patches are formed by taking layer 1 of raw rubber or nonvulcanizing stock then placing a layer of vulcanizing stock on this, preferably coextensive with layer 1, and then arranging the third layer of vulcanizing stock of smaller diameter than layer 2. These associated layers may be fashioned if desired so as to give a thinner edge to the patch than the body of the patch as shown in Fig. 2. The associated layers are then placed on a fabric as shown in Fig. 3. Any form of vulcanization may be used. As shown, the several layers of fabric with the patches arranged thereon, are placed in a pan 5, the layers being separated by a soap stone 6.

Where the scheme of vulcanizing here shown is used, the fabric, even though a glazed fabric is used, is under the action of the steam made pervious to air. This mounting of fabric, however, facilitates the manufacture of patches very greatly and also forms a surface which may be coated in a desirable manner so as to exclude the air or practically exclude the air from the face of the patch. The patch itself, through the action of vulcanization, is attached throughout its surface to the fabric so that all that is necessary is to treat the fabric so as to get approximately an air proof surface. I accomplish this by surfacing the fabric with a glaze 7, preferably a starch solution, and it will be understood that the layer 7 may be a separate layer attached to the fabric or any layer of air proofing material.

What I claim as new is:—

1. The method of forming patches for rubber articles which consists in forming a patch of a layer of vulcanizing stock and a layer of non vulcanizing stock, vulcanizing the vulcanizing layer in contact with the layer of non vulcanizing stock with the face of the non vulcanizing layer in contact with the fabric forming a mount for the patch and then air proofing the fabric.

2. The method of forming patches for rubber articles which consists in forming a patch of a layer of vulcanizing stock and a layer of non vulcanizing stock, vulcanizing the vulcanizing layer in contact with the layer of non vulcanizing stock with the face of the non vulcanizing layer in contact with the fabric forming a mount for the patch and then air proofing the fabric by the application of an air proofing substance in fluid state.

In testimony whereof I have hereunto set my hand in the presence of two subscribing witnesses.

JOSEPH G. MOOMY.

Witnesses:
B. M. HARTMAN,
V. C. HESS.